(12) United States Patent
Appalucci et al.

(10) Patent No.: US 6,988,666 B2
(45) Date of Patent: Jan. 24, 2006

(54) SECURITY TAG AND PROCESS FOR MAKING SAME

(75) Inventors: Lawrence Appalucci, Villanova, PA (US); Andre Cote, Williamstown, NJ (US); David Lopez Perez, Ponce, PR (US); Gary Thomas Mazoki, Sewell, NJ (US); Anthony Frank Piccoli, Audubon, NJ (US); Rolando Roques Martinez, Ponce, PR (US); Luis Francisco Soler Bonnin, Guanica, PR (US); Takeshi Matsumoto, Kohza-gun (JP); Hideaki Imaichi, Fujisawa (JP)

(73) Assignee: Checkpoint Systems, Inc., Thorofare, NJ (US)

(*) Notice: Subject to any disclaimer, the term of this patent is extended or adjusted under 35 U.S.C. 154(b) by 474 days.

(21) Appl. No.: 10/235,733

(22) Filed: Sep. 5, 2002

(65) Prior Publication Data

US 2003/0051806 A1 Mar. 20, 2003

Related U.S. Application Data

(60) Provisional application No. 60/322,666, filed on Sep. 17, 2001.

(51) Int. Cl.
  *G06K 19/00* (2006.01)
(52) U.S. Cl. ............... 235/488; 235/487; 235/492; 235/495
(58) Field of Classification Search .......... 235/375, 235/380, 487, 488, 492, 495
See application file for complete search history.

(56) References Cited

U.S. PATENT DOCUMENTS

| | | |
|---|---|---|
| 2,969,300 A | 1/1961 | Franz |
| 3,497,410 A | 2/1970 | Zagusta et al. |
| 4,021,705 A | 5/1977 | Lichtblau |
| 4,369,557 A | 1/1983 | Vandebult |
| 4,482,874 A | 11/1984 | Rubertus et al. |
| 4,495,232 A | 1/1985 | Bauser et al. |
| 4,555,291 A | 11/1985 | Tait et al. |
| 4,578,654 A | 3/1986 | Tait |
| 4,717,438 A | 1/1988 | Benge et al. |
| 4,730,095 A | 3/1988 | Richter-Jorgenson |
| 4,778,552 A | 10/1988 | Benge et al. |
| 4,797,785 A | 1/1989 | Jorgensen |
| 4,818,312 A | 4/1989 | Benge |
| 4,846,922 A | 7/1989 | Benge et al. |

(Continued)

FOREIGN PATENT DOCUMENTS

EP 0 142 380 B1 5/1985

(Continued)

*Primary Examiner*—Karl D. Frech
(74) *Attorney, Agent, or Firm*—Caesar, Rivise, Bernstein, Cohen & Pokotilow, Ltd.

(57) ABSTRACT

A tag and method of making it. The tag includes a first adhesive layer provided in a first predetermined pattern between a surface of a first substrate and a first conductive foil. The first pattern corresponds to a pattern for a first conductive trace, e.g., a portion of a resonant circuit. The first conductive foil is laminated, e.g., adhesively secured, to the surface of the first substrate to form a first conductive layer. A first portion of that layer is shaped, e.g., die-cut, to generally correspond to the first pattern. A second portion of the first conductive layer not corresponding to the first portion is removed, to establish the first conductive trace, with the adhesive layer confined within the boundaries of the first conductive trace. Another conductive trace is secured to the first conductive trace, with a dielectric therebetween, to form a resonant circuit.

94 Claims, 8 Drawing Sheets

U.S. PATENT DOCUMENTS

| | | |
|---|---|---|
| 4,876,555 A | 10/1989 | Jorgensen |
| 4,900,386 A | 2/1990 | Richter-Jörgensen |
| 4,954,814 A | 9/1990 | Benge |
| 4,970,495 A | 11/1990 | Matsumoto et al. |
| 5,006,856 A | 4/1991 | Benge et al. |
| 5,059,950 A | 10/1991 | Perchak |
| 5,108,822 A | 4/1992 | Imaichi et al. |
| 5,119,070 A | 6/1992 | Matsumoto |
| 5,165,987 A | 11/1992 | Oehlmann et al. |
| 5,170,544 A | 12/1992 | Pichl |
| 5,174,847 A | 12/1992 | Pichl |
| 5,184,111 A | 2/1993 | Pichl |
| 5,187,466 A | 2/1993 | Pichl |
| 5,201,988 A | 4/1993 | Matsumoto et al. |
| 5,447,779 A | 9/1995 | Imaichi et al. |
| 5,589,251 A | 12/1996 | Imaichi et al. |
| 5,645,932 A | 7/1997 | Uchibori |
| 5,682,814 A | 11/1997 | Imaichi et al. |
| 6,214,444 B1 | 4/2001 | Uchibori |
| 6,313,747 B2 | 11/2001 | Imaichi et al. |
| 6,383,616 B1 | 5/2002 | Uchibori |
| 6,458,465 B1 | 10/2002 | Uchibori |
| 6,618,939 B2 | 9/2003 | Uchibori et al. |
| 2002/0025416 A1 | 2/2002 | Uchibori |
| 2004/0025324 A1 | 2/2004 | Uchibori et al. |

FOREIGN PATENT DOCUMENTS

| | | |
|---|---|---|
| EP | 0 316 847 A2 | 5/1989 |
| EP | 0 340 670 A2 | 11/1989 |
| EP | 0 316 847 A3 | 12/1990 |
| EP | 0 285 559 B1 | 5/1992 |
| GB | 2 211 702 A | 7/1989 |
| WO | WO 92/21113 A1 | 11/1992 |

FROM FIG. 3E  FROM FIG. 3F

SECURITY TAG AND PROCESS FOR MAKING SAME

CROSS-REFERENCE TO RELATED APPLICATIONS

This application claims the benefit of U.S. Provisional Patent Application No. 60/322,666, filed Sep. 17, 2001 entitled "Security Tag and Process for Making Same", the subject matter of which is incorporated herein by reference.

BACKGROUND OF THE INVENTION

The present invention relates to resonant tags and more particularly to a process for making resonant frequency circuits for use as resonant tags.

Resonant tags are tags which include a passive electrically resonant frequency circuit which resonates at a predetermined frequency when stimulated by a radio frequency electromagnetic field at about the resonant frequency of the tag and which is incident upon the resonant tag. The resonant frequency circuit resonating within a region occupied by the electromagnetic field perturbs the electromagnetic field. The perturbation of the electromagnetic field is detectable by suitable equipment. Consequently, the presence of a resonant tag within a prescribed region may be detected.

Typically, resonant tags are attached to goods sold at retail in order to deter theft. Resonant tags used for this purpose are capable of being removed from the goods or deactivated when a legitimate sale is consummated. Resonant tags which are not removed or deactivated at the point of sale may be detected by suitable detection apparatus, generally placed at points of exit from a retail establishment.

Typically, a resonant tag comprises a generally flat thin laminate of a dielectric layer separating conductor layers. Typically, one of the conductor layers comprises a flat spiral conductor (coil) forming an inductance, and one plate of a capacitor connected to a proximal end of the coil. A second plate of the capacitor is formed on the second conductor layer. A through connection between the second plate and a distal end of the coil completes the resonant frequency circuit comprising the coil inductor and the capacitor.

It is required that the inductive and capacitive elements of resonant tags be manufactured with precision in order that the resonant frequency of the tags be held within prescribed limits. A generally used method for making resonant tags employs etching a metallic foil to form the components of the conductive layers. This process, while yielding the necessary precision, results in excessive waste of the metallic foil.

Accordingly, it would be desirable to have a process for making resonant tags which maximizes the yield of completed tags and minimizes waste material resulting from making the tags.

BRIEF SUMMARY OF THE INVENTION

Briefly stated, the present invention comprises a preferred method of making a resonant frequency circuit. The method includes the steps of: (1) forming a first adhesive layer in a first predetermined pattern on a surface of a first substrate; (2) laminating a first conductive foil to the surface of the first substrate to form a first conductive layer; (3) forming a first portion of the first conductive layer in a shape generally corresponding to the first predetermined pattern; and (4) removing a second portion of the first conductive layer not corresponding to the first portion to thereby establish a first conductive trace on the surface of the first substrate.

The present invention also comprises an alternate method of making a resonant frequency circuit. The method includes the steps of: (1) securing a first conductive foil to a first surface of a first substrate to form a first conductive layer; (2) etching the first conductive layer to form a first conductive trace, the first conductive trace including at least one inductor and at least one first capacitor plate; (3) securing a second conductive foil to a second substrate to form a second conductive layer; (4) forming a second conductive trace on the second substrate by cutting the second conductive layer; (5) removing a waste portion of the second conductive layer, wherein the second conductive trace includes at least a second capacitor plate; and (6) laminating the second conductive trace to the first conductive trace with a dielectric layer therebetween, the at least one second capacitor plate overlying and generally aligned with the at least one first capacitor plate.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Referring to the drawings, wherein like numerals are used to indicate like elements throughout the several figures, the use of the indefinite article "a" may indicate a quantity of one, or more than one, of an element, and the use of the article "or" indicates a Boolean "exclusive or" function there is shown in FIGS. 1 and 3A–3E a process 10a for making a resonant tag according to a first preferred embodiment.

Figure 1:
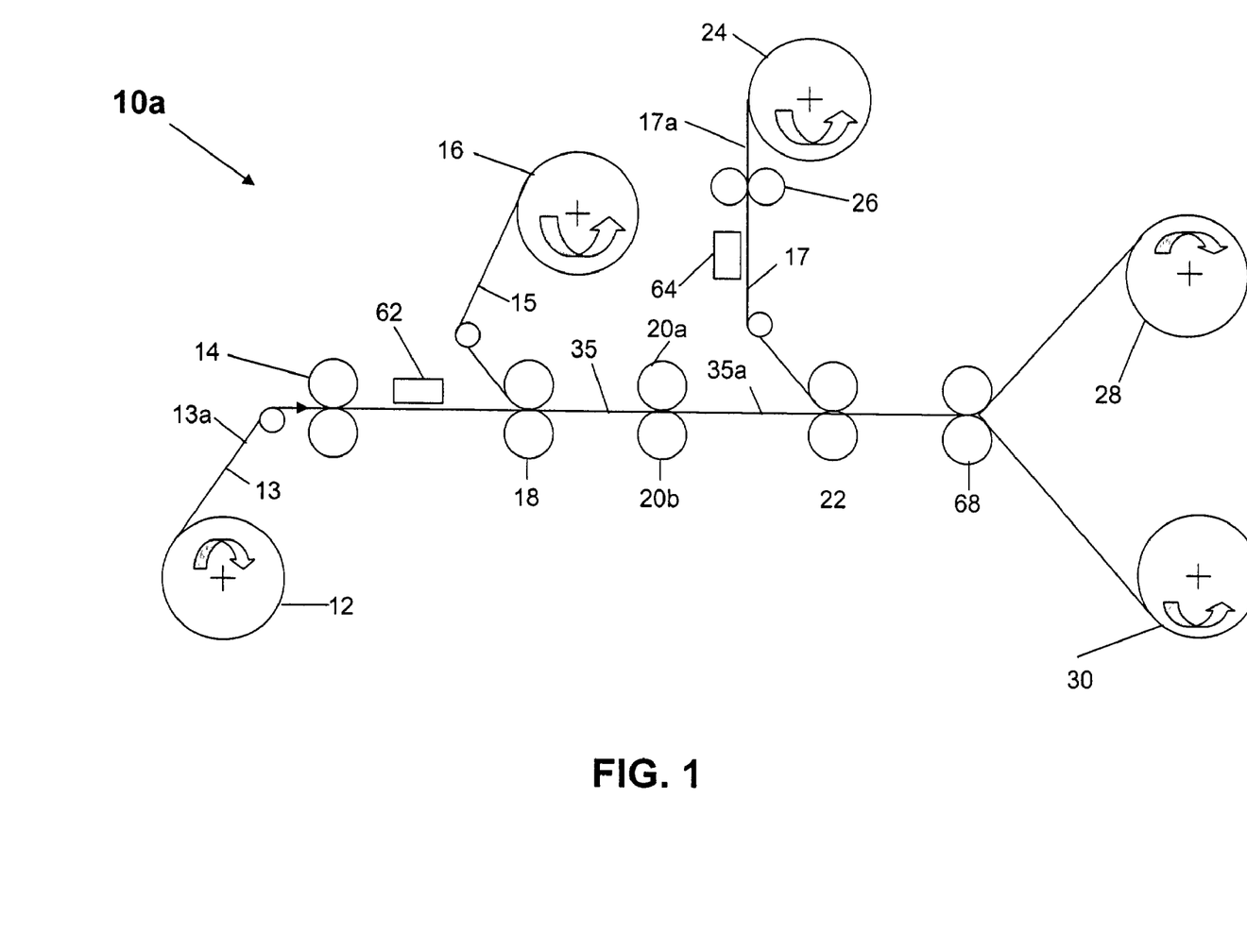
FIG. 1 is schematic diagram of a process for making first and second laminates of a resonant tag according to a first preferred embodiment.
Figure 2:
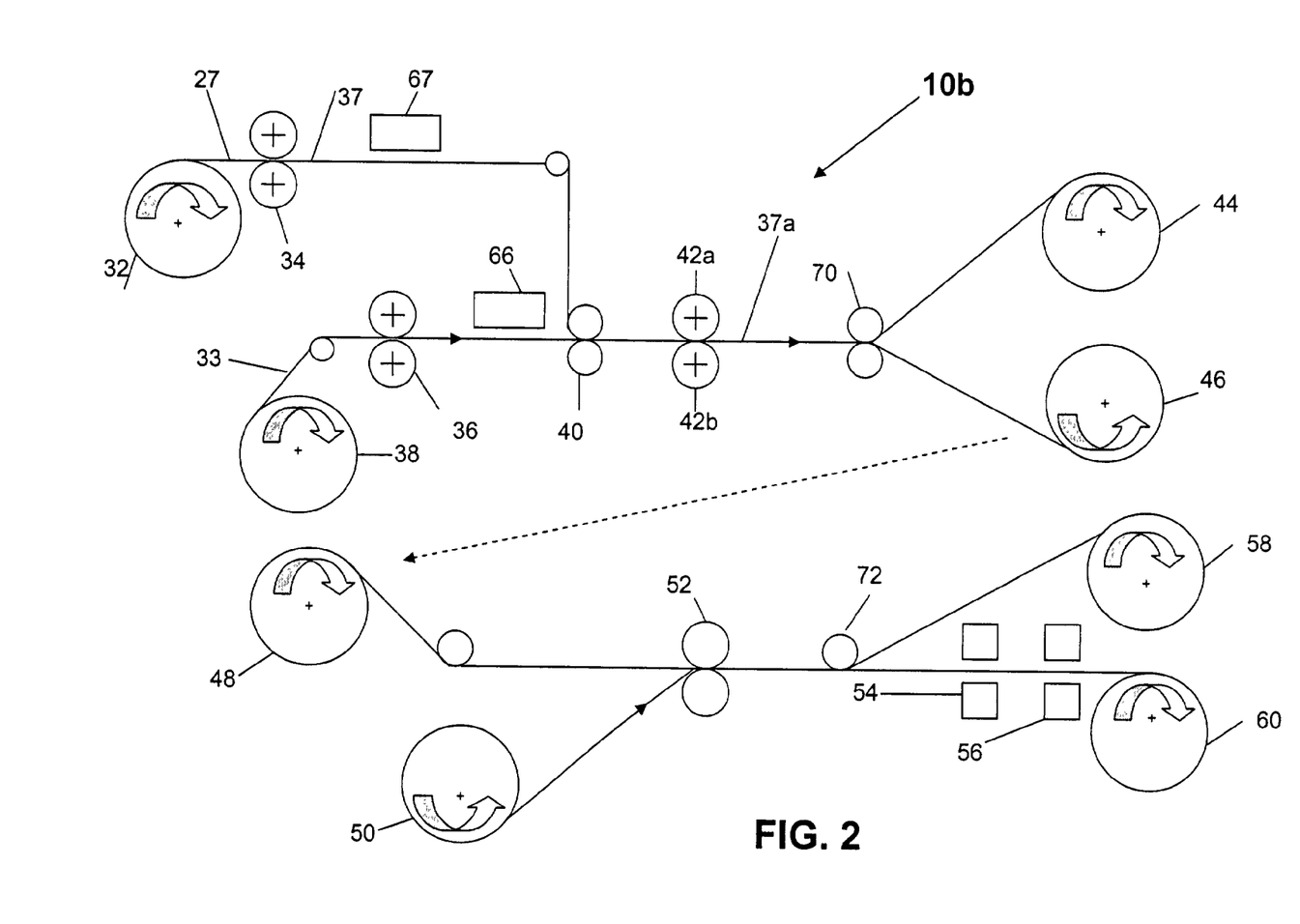
FIG. 2 is a schematic diagram of a process for making a third laminate and securing the third laminate to either the first laminate or the second laminate.
Figure 3A:
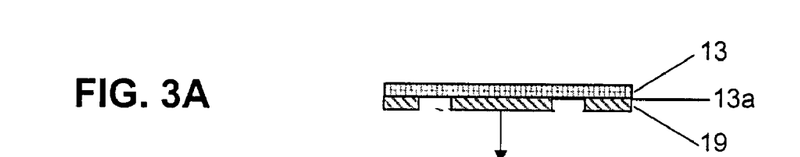
FIGS. 3A–3F are schematic cross-section diagrams of the resonant tag as fabricated by the process shown in FIG. 1.

According to a first preferred embodiment, a first substrate 13 for the resonant tag is stored on a first unwind roll 12. Preferably, the first substrate 13 is paper which has been calendered in order to provide a densified sheet having a smooth finish and a uniform thickness. An adhesive is applied to a surface 13a of the first substrate 13 as the first substrate 13 is removed from the unwind roll 12 (FIG. 3A). The adhesive forms a first adhesive layer 19 in a first predetermined pattern on the surface 13a of the substrate 13. Preferably, the adhesive forming the first adhesive layer 19 is an aggressive, pressure sensitive adhesive such as a vinyl acetate monomer, which provides a high initial tack when cured by an air dryer 62 and which achieves a high bonding strength when subjected to pressure. Other types of aggressive adhesives such as heat seal adhesives and those which may be cured by ultra violet rays or electron beams may also be used. Preferably, the adhesive is applied to the surface 13a of the first substrate 13 by a printing station 14. More preferably, the adhesive is applied to the surface 13a by flexographic printing. However, other methods for providing the adhesive layer 19 in the first pattern, such as gravure printing, letter pressing etc. are within the spirit and scope of the invention.

Figure 3B:
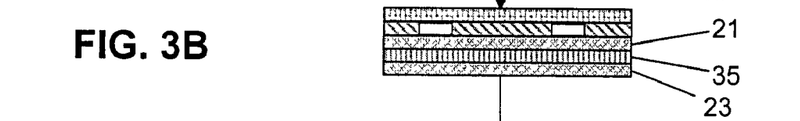

A first conductive foil 15, is stored on a second unwind roll 16. Preferably, the first conductive foil 15 is an aluminum alloy having a purity of about 98%, a thickness in the range of 20–100 microns and preferably 30–70 microns, and forming properties such as hardness and ductility suitable for diecutting. The first conductive foil 15 is removed from the unwind roll 16 and is laminated to the surface 13a of the first substrate 13 by laminating rolls 18 to form a first conductive layer 35 (FIG. 3B). The first adhesive layer 19 acts as an agent for bonding the first conductive layer 35 to the first substrate 13 in a region corresponding to the first predetermined pattern.

Prior to being laminated to the first substrate 13, both sides of the first conductive foil 15 are flood coated with a dielectric to provide dielectric layers 21, 23 having a thickness in the range of 1–25 microns and preferably 1–10 microns. Preferably, the dielectric is a heat seal dielectric material, such as polyethylene which readily bonds to aluminum. However, other dielectric materials, such as a styrene-acylate polymer or a vinyl acetate could also be used. Preferably, the foil 15 is purchased with the dielectric layers 21, 23 already applied. However, the dielectric layers 21, 23 may be applied to the foil 15 by printing the dielectric on-line using a gravure knife over roll or a similar printing process.

Figure 3C:
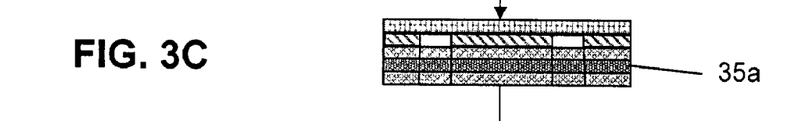
Figure 3D:
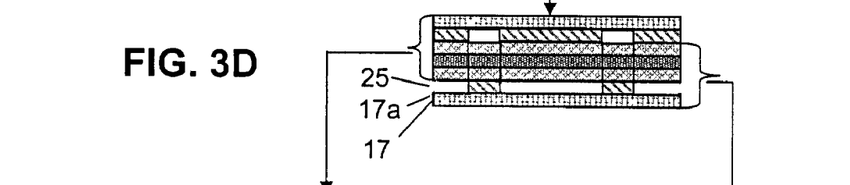

The first conductive layer 35 is patterned to form a patterned first conductor layer 35a having a first portion and a second portion (FIG. 3D). Preferably, the first portion of the patterned first conductive layer 35a is formed into a shape generally corresponding to the location and to the pattern of the first such that the first adhesive layer 19 lays substantially within an area of the first portion (FIG. 3C). Preferably, the first portion is formed by cutting the first dielectric layer 21, the first conductive layer 35 and the second dielectric layer 23 with a die 20a and an anvil 20b, or a similar tool, without cutting the first substrate 13.

A second substrate 17 is stored on a third unwind roll 24. Preferably, the second substrate 17 is paper which has been calendered in a manner similar to the first substrate 13. An adhesive is applied to a surface 17a of the second substrate as the second substrate 17 is removed from the third unwind roll 24. The adhesive forms a second adhesive layer 25 (FIG. 3D) on the surface 17a of the second substrate 17. The second adhesive layer 25 is applied to form a second predetermined pattern which generally corresponds to the shape and the location of the second portion of the patterned first conductive layer 35a (FIG. 3D). In the first preferred embodiment, the first and the second predetermined patterns are interlocking and non-overlapping patterns which minimize the wasting of foil in making the tags. Preferably, the adhesive forming the second adhesive layer 25 is an aggressive, pressure sensitive adhesive such as a vinyl acetate monomer, which provides a high initial tack when cured by an air dryer 64 and which achieves a high bonding strength when subjected to pressure. Other types of aggressive adhesives such as heat seal adhesives and those which may be cured by ultra violet rays or electron beams may also be used. Preferably, the adhesive is applied to the surface 17a of the second substrate 17 by a printing station 26 and cured at station 64. More preferably, the adhesive is applied to the second substrate 17 by flexographic printing. However, other methods for providing the adhesive layer 25, such as gravure printing, are within the spirit and scope of the invention.

Figure 3E:
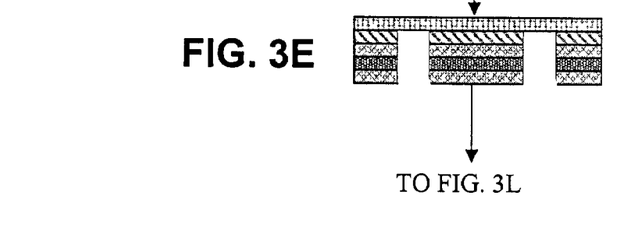

The second portion of the patterned first conductive layer 35a is removed from the first conductive layer 35 to thereby establish a first conductive trace on the surface 13a of the first substrate 13. Preferably, the second portion is removed by first laminating the second substrate 17 to the patterned first conductive foil 35a on the first substrate 13 by laminating rolls 22 such that the second adhesive pattern engages the second portion of the patterned first conductive layer 35a. After the first substrate 13 and the second substrate 17 are laminated together, the second portion is removed from the patterned first conductive foil 35a by separating the second substrate 17, including the second portion of the patterned first conductive layer 35a, from the first substrate 13 by passing the laminated first substrate 13 and second substrate 17 through splitting rolls 68 and subsequently drawing the second substrate 17 onto a first rewind roll 28 and the first substrate 13 onto a second rewind roll 30. As a result of removing the second substrate 17 from the first substrate 13, a first conductive trace is established on the surface 13a of the first surface 13, and a first laminate is formed comprising the first substrate 13, the first adhesive 19, the first portion of the patterned first conductive layer 35a and the dielectric layers 21, 23 (FIG. 3E). The first laminate is stored on a second rewind roll 30.

Figure 3F:
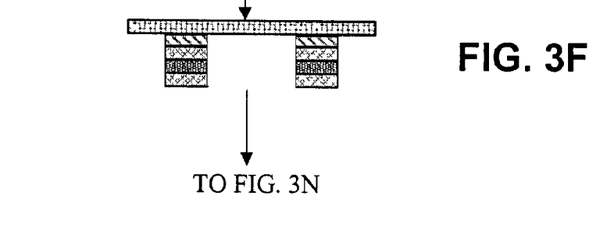
Figure 3G:
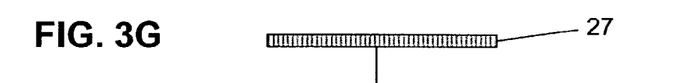
FIGS. 3G–3O are schematic cross-section diagrams of the resonant tag as fabricated by the process shown in FIG. 2.

Preferably, as a result of removing the second substrate 17 from the first substrate 13 including the second portion of the patterned first conductive layer 35a, a second conductive trace is established on the surface 17a of the second substrate 17 and a second laminate is formed which comprises the second substrate 17, the second adhesive layer 25, the second portion of the first conductive layer 35 and the dielectric layers 21, 23 (FIG. 3F). The second laminate is stored on the first rewind roll 28 simultaneously with storing the first laminate on the second rewind roll 30.

Figure 4:
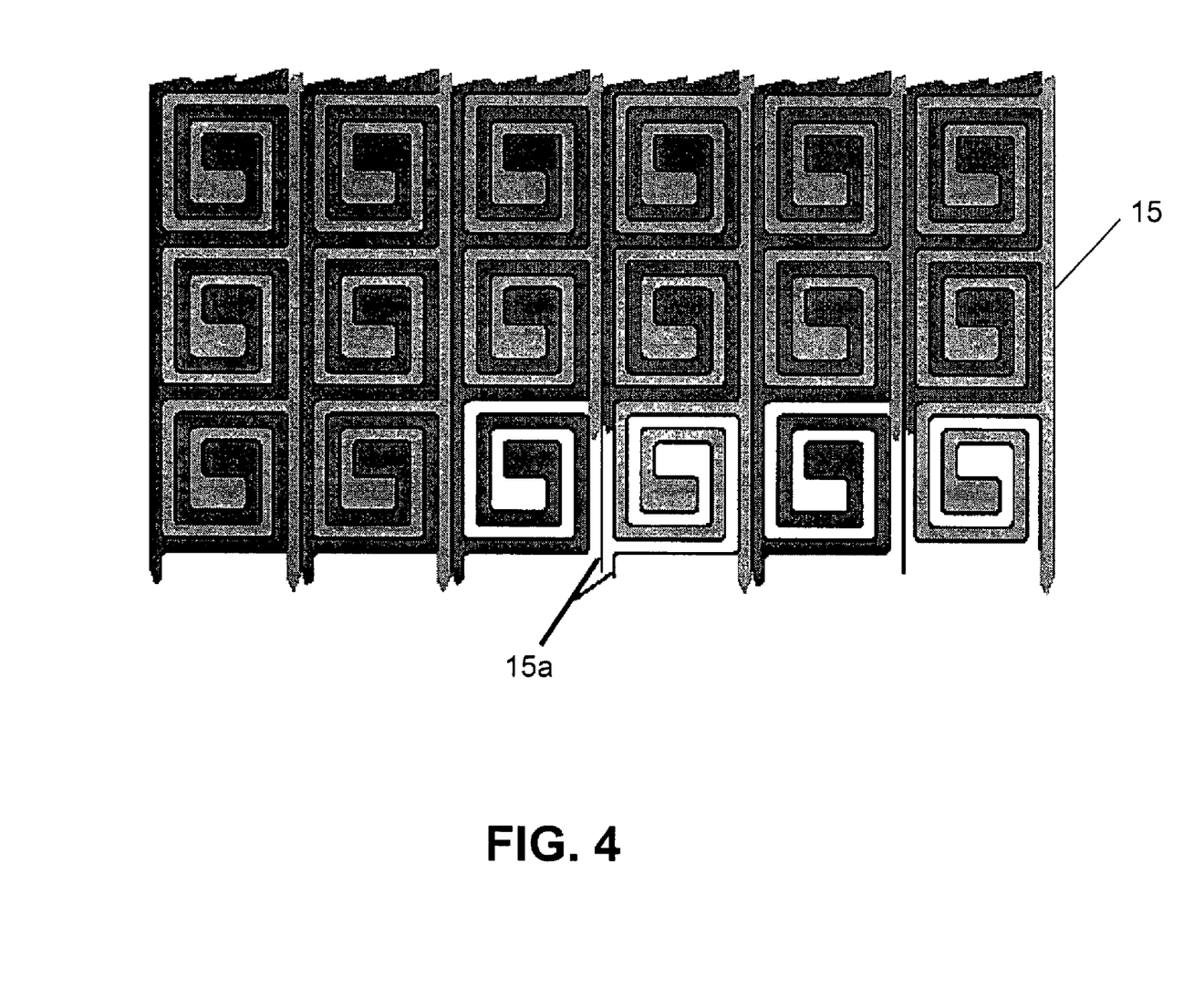
FIG. 4 is an illustration of a metallic foil diecut in accordance with the process shown in FIG. 1.

Preferably, the first and the second conductive traces each comprise an inductor and a capacitor plate. FIG. 4 illustrates the first conductive foil 15 after it has been cut by the diecutter 20a and the anvil 20b to form the patterned first conductive layer 35a. As will be appreciated by examining FIG. 4, the die cut lines 15a formed in the first conductive foil 15 separate the first conductive layer 35 into the first and second portions. The first and second portions form the first and the second conductive traces when the second portion is removed from the patterned first conductive layer 35a. The first and the second conductive traces each comprise one or more planar spiral patterns (i.e. coils), each functioning as an inductor, and one or more lands, each of which functions as a first plate of a capacitor. Preferably, the first and the second conductive traces each comprise a single coil and a single land, with the inductance of the coil formed from the first conductive trace being substantially equal to the inductance of the coil formed from the second conductive trace but coiled in the opposite direction. Thus the first and second conductive traces are generally the same (except for the orientations of the spiral) and both can be used to form resonant frequency tags. Also, the shape and the area of the land on the first conductive trace is preferably substantially equal to the area of the land of the second conductive trace.

Figure 5:
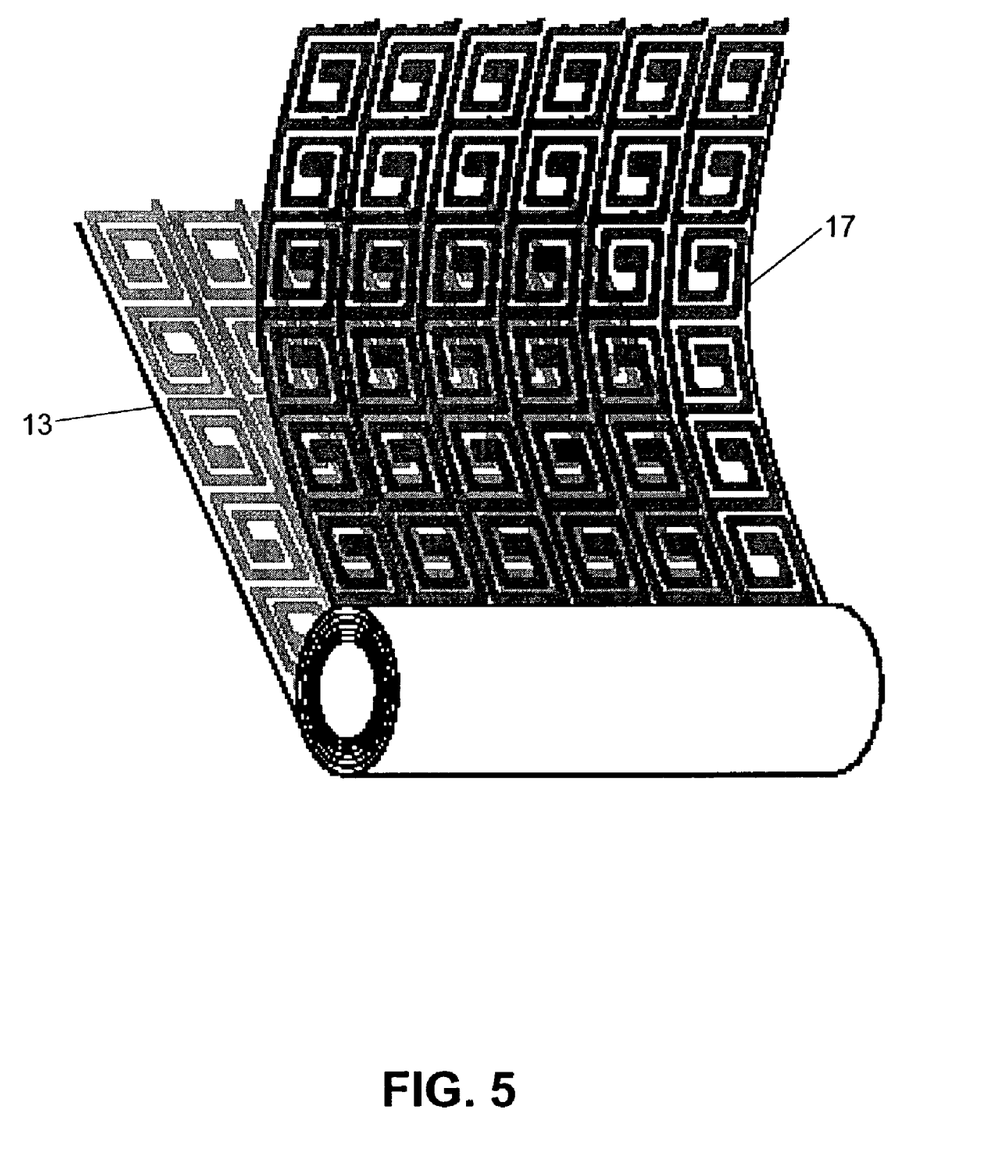
FIG. 5 is an illustration of removing the second substrate from the first substrate to form the first and second laminates in accordance with the process shown in FIG. 1.

FIG. 5 illustrates the process of separating the second substrate 17 from the first substrate 13.

Figure 3H:
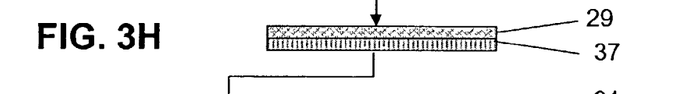

Referring now to FIG. 2 and FIGS. 3G–3O, there is shown a process 10b for making a third laminate and for securing the third laminate to one of the first and the second laminates to form the completed resonant tag. A second conductive foil 27 (FIG. 3G) is stored on a fourth unwind roll 32. Preferably, the second conductive foil 27 is an aluminum alloy having a purity of about 98%, a thickness in the range of 8–50 microns and properties such as hardness and ductility suitable for diecutting. The second conductive foil 27 is used for making a second conductive layer 37 (FIG. 3H). A third dielectric layer 29 (FIG. 3H) having a thickness in the range of 1–25 microns, and preferably 1–10 microns, is formed on a first surface of the second conductive layer 37 by flood coating the first surface of the second conductive foil 27 with a dielectric material. Preferably, the dielectric is a heat seal dielectric material, such as polyethylene, or a vinyl acetate which readily bonds to aluminum. In the first preferred embodiment, the third dielectric layer 29 is formed by a printing station 34 as the second foil 27 is drawn from the fourth unwind roll 32 (FIG. 3H). The heat seal dielectric is subsequently cured by an air dryer 67. Alternatively, the second conductive foil 27 may be purchased with the dielectric pre-cast to the foil 27.

Figure 3I:
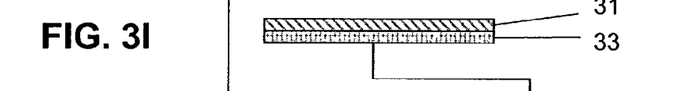
Figure 3J:
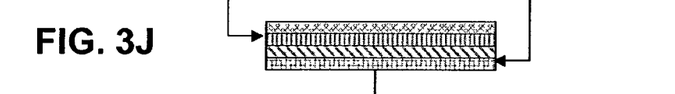
Figure 3K:
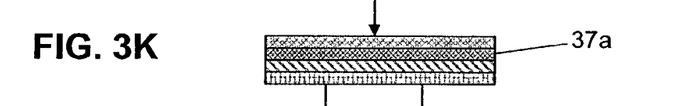

A third substrate 33 used as a carrier is stored on a fifth unwind roll 38. Preferably, the third substrate 33 is calendered paper, similar in properties to the paper used for the first and the second substrates 13, 17. In the first preferred embodiment, an adhesive is flood coated on a first surface of the of the third substrate 33 by a third adhesive printing station 36 to form a third adhesive layer 31, as the second conductive foil is drawn from the fourth unwind roll 32 (FIG. 3I). Preferably, the adhesive is a removable pressure sensitive adhesive, cured by an air dryer 66. Alternatively, the adhesive on the third adhesive layer 31 may be cured by other means such as for example, ultraviolet radiation or electron beam radiation. The third substrate 33 is laminated to a second side of the second conductive foil 27 by laminating rolls 40 (FIG. 3J). Following the lamination of the third substrate 33 to the second conductive foil 27, the second conductive foil 27 is cut to form a patterned second conductive layer 37a having a first portion in the shape of a third conductive trace. Preferably the second conductive foil 27 is cut with a diecutter 42a and an anvil 42b, which cuts the third dielectric layer 29 and the second conductive layer 37 without cutting the third substrate 33. Preferably, the shape and the size of the third conductive trace corresponds to one or more of the third capacitor plates formed in the patterned first conductive layer 35a.

Following the cutting of the second conductive layer 37 (FIG. 3K), a second portion of the patterned second conductive layer 37a not corresponding to the first portion is removed from the third substrate 33 by drawing the laminated third substrate 33 through splitting rollers 70. Subsequently, the second portion of the patterned second conductive layer 37a is then drawn to a third rewind roll 44 as waste. Simultaneously, the third substrate 33, including the first portion forming the third conductive trace is drawn to a fourth rewind roll 46 to form a third laminate.

Figure 3L:
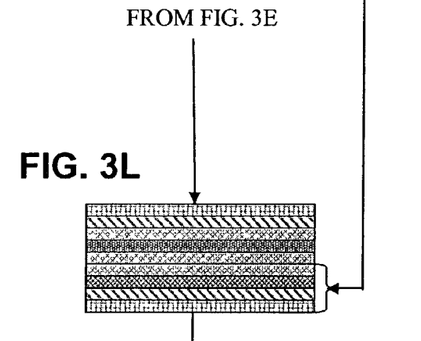
Figure 3M:
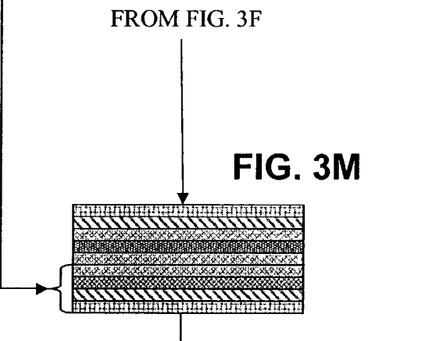

In order to complete the fabrication of the resonant tag, either the first conductive trace formed on the first laminate or the second conductive trace formed on the second laminate is secured to the third conductive trace with a dielectric layer therebetween to form a final laminate. In the first preferred embodiment, either the first laminate or the second laminate is mounted on a sixth unwind roll 50. The third laminate is mounted on a seventh unwind roll 48. The first or second laminate mounted on the sixth unwind roll 50 and the third laminate mounted on the seventh unwind roll 48 are simultaneously drawn from the respective unwind rolls 48, 50. The first or the second laminate is secured to the third laminate such that the respective first or second conductive capacitor plate is overlying and generally aligned with the third capacitor plate to form the capacitor portion of a resonant frequency circuit (FIGS. 3L and 3M). Preferably, the repeat length of the third conductive trace (third capacitor) matches the repeat length of the respective first or second conductive trace. Alternatively, the repeat length of the third conductive trace may be made smaller than the respective first or second conductive trace and aligned with the respective first or second capacitor plate by re-registration of the third laminate at each repeat length of the respective first or second conductive trace.

The first or second laminate is secured to the third laminate by pressing and heating the laminates at pressing and heating station 52. At least an area of the third substrate which is greater than the area of the third conductive trace is heated in order to activate and cure the heat seal dielectric previously applied to the surfaces of the first conductive foil 15 and the second conductive foil 27.

Figure 3N:
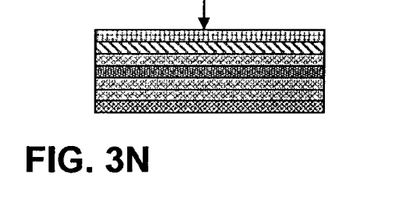
Figure 3O:
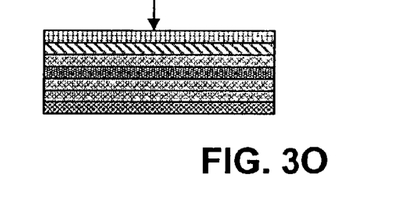

Following the securing of the first or second laminates to the third laminate, the third substrate 33 carrier and third adhesive layer 31, (i.e. the removable adhesive), are stripped from the first or the second laminates by stripping rolls 72 and stored as waste on a fifth rewind 58. The remaining first or second laminate forms a final laminate (FIGS. 3N and 3O). An electrical connection is then formed between the end of the first or second coil not connected to the respective first or second capacitor plate, and the third capacitor plate. Preferably, the connection is made by a crimper 54 which crimps the sides of the final laminate together with pressure and/or heat so that a low resistance connection between the first conductive layer and the second conductive layer is formed. The remaining final laminate is then subjected to heat and/or pressure in a portion of the area of the capacitor plates by a deactivation station 56 to create a weak spot in the dielectric to facilitate deactivation of the resonant tag. As would be understood by those skilled in the art, a variety of techniques for creating a connection and a deactivation region are suitable for use with the present invention, and are considered to be within the spirit and scope of the invention. Following the forming of the connection and of the deactivation areas, the final laminate is stored on the rewind roll 60.

The final laminate stored on rewind roll 60 is then further processed in a well known finishing process to form a pressure sensitive resonant frequency security tag (label). In preparing the final laminate for a typical application, the finishing process includes coating the patterned second conductive layer 37a with a pressure sensitive adhesive, laminating a silicone release liner against the pressure sensitive adhesive, printing and diecutting final laminate in registration with the conductive traces, removing waste, slitting the final laminate to form lanes of tags and rewinding the lanes onto individual rolls. The specific steps for processing of the final laminates into tags is well known to those skilled in the art and is not repeated here for the sake of brevity.

As would be clear to those skilled in the art, it is not necessary to form the final laminate with two layers of dielectric (29 and 21 or 23) between the conductive layers 35, 37. The final laminate may be formed with only one dielectric and would still be considered within the spirit and scope of the invention. The final laminate could be formed by either (1) not coating the first conductive foil 15 with the first and second dielectric layers 21, 23 and relying on the third dielectric layer 29 or (2) not coating the second conductive foil 27 with the third dielectric layer 29 and relying on the first and second dielectric layers 21, 23.

Figure 6:
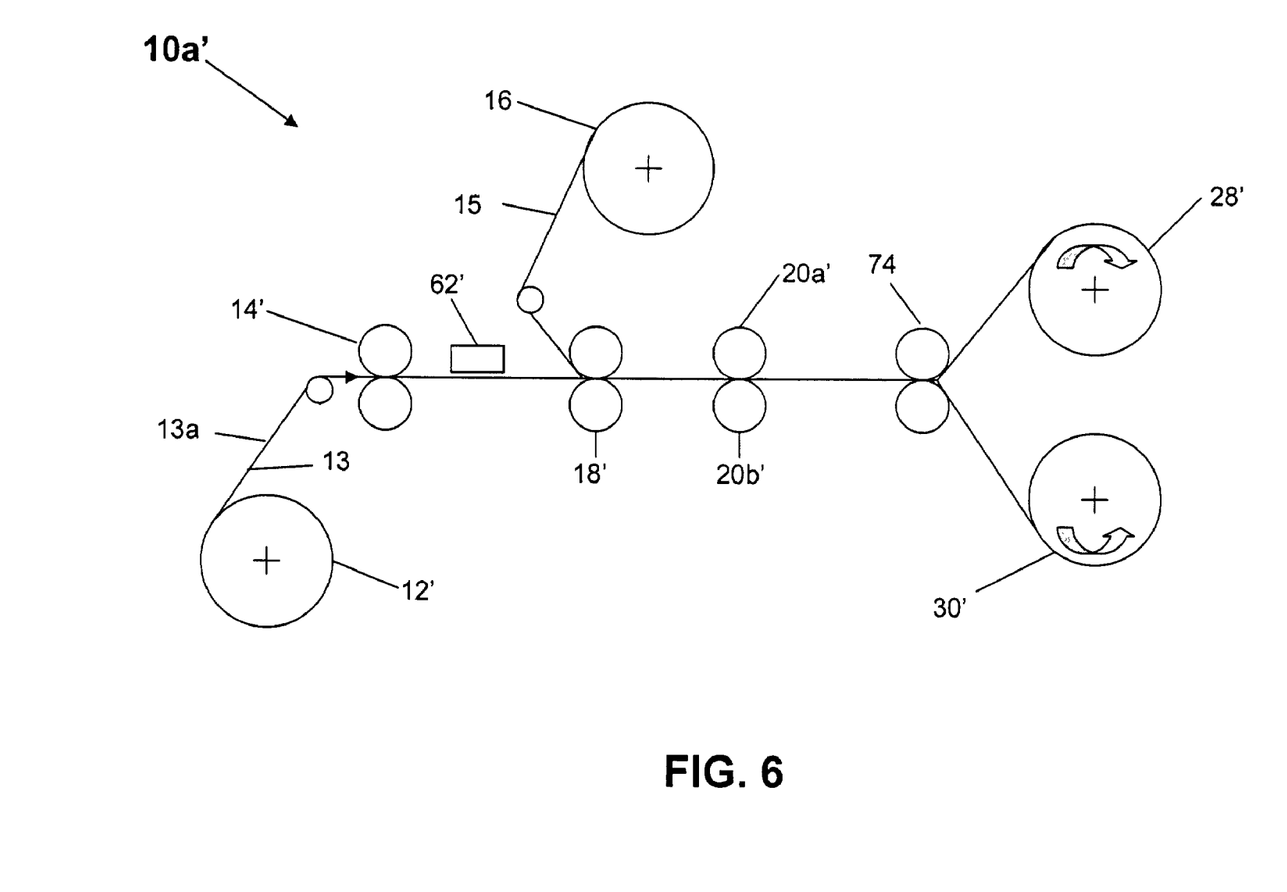
FIG. 6 is a schematic diagram of a process for making a first laminate of a resonant tag according to a second preferred embodiment.

Referring now to FIG. 6, there is shown a second preferred embodiment of a process 10a' for making a resonant tag. The second preferred embodiment is identical to the first preferred embodiment except that only a first conductive trace on the first substrate 13 is formed on the second substrate 17 and not a second conductive trace. According to the second preferred embodiment, a first substrate 13 for the resonant tag is stored on a first unwind roll 12'. Preferably, the first substrate 13 is paper which has been calendered in order to provide a densified sheet having a smooth finish and a uniform thickness. An adhesive is applied to a surface 13a of the first substrate 13 as the first substrate 13 is removed from the unwind roll 12' (FIG. 3A). The adhesive forms a first adhesive layer 19 in a first predetermined pattern on the surface 13a of the substrate 13. Preferably, the adhesive forming the first adhesive layer 19 is an aggressive, pressure sensitive adhesive such as a vinyl acetate monomer, which provides a high initial tack when cured by an air dryer 62' and which achieves a high bonding strength when subjected to pressure. Other types of aggressive adhesives such as heat seal adhesives and those which may be cured by ultra violet rays or electron beams may also be used. Preferably, the adhesive is applied to the surface 13a of the first substrate 13 by a printing station 14'. More preferably, the adhesive is applied to the surface 13a by flexographic printing. However, other methods for providing the adhesive layer 19, such as gravure printing, are within the spirit and scope of the invention.

A first conductive foil 15 is stored on a second unwind roll 16'. Preferably, the first conductive foil 15 is a 98% pure aluminum alloy having a thickness in the range of 20–100 microns and preferably 30–70 microns, which has forming properties such as hardness and ductility suitable for diecutting. The first conductive foil 15 is removed from the unwind roll 16' and is laminated to the surface 13a of the first substrate 13 by laminating rolls 18' to form a first conductive layer 35 (FIG. 3B). The first adhesive layer 19 acts as an agent for bonding the first conductive layer 35 to the first substrate 13 in a region corresponding to the first predetermined pattern.

Prior to being laminated to the first substrate 13, both sides of the first conductive foil 15 are flood coated with a dielectric to provide dielectric layers 21, 23 having a thickness in the range of 1–25 microns and preferably 1–10 microns. Preferably, the dielectric is a heat seal dielectric material, such as polyethylene which readily bonds to aluminum. However, other materials, such as a styrene-acylate polymer or a vinyl acetate could also be used. Preferably, the foil 15 is purchased with the dielectric layers 21, 23 already applied. However, the dielectric layers 21, 23 may be applied to the foil 15 by printing the dielectric on-line using a gravure knife over roll or a similar printing process.

The first conductive layer 35 is patterned to form a patterned first conductor layer 35a having a first portion and a second portion (FIG. 3D). Preferably, the first portion of the patterned first conductive layer 35a is formed into a shape generally corresponding to the location and to the pattern of the first adhesive layer 19 such that the first adhesive layer 19 lays substantially within an area of the first portion (FIG. 3C). Preferably, the first portion is formed by cutting the first dielectric layer 21, the first conductive layer 35 and the second dielectric layer 23 with a die 20a' and an anvil 20b', or a similar tool, without cutting the first substrate 13.

The second portion of the patterned first conductive layer 35a is removed from the first conductive layer 35 to thereby establish a first conductive trace on the surface 13a of the first substrate 13. Preferably, the second portion is removed from the patterned first conductive foil 35a by separating the second portion of the patterned first conductive layer 35a from the first substrate 13 by first passing the first substrate 13 through the splitting rollers 74 and subsequently: (1) drawing the second portion of the first conductive layer 35a onto a first rewind roll 28' as waste and (2) the first substrate 13, including the first portion, onto a second rewind roll 30'. As a result of removing the second portion from the first substrate 13, a first conductive trace is established on the surface 13a of the first substrate 13 and a first laminate is formed comprising the first substrate 13, the first adhesive layer 19, the first portion of the patterned first conductive layer 35a and the dielectric layers 21, 23 (FIG. 3E). The first laminate is stored on the second rewind roll 30'. The fabrication of the resonant tag is completed by mounting the first laminate onto the unwind roll 48 (FIG. 2) and completing the process 10b as described above.

A third preferred embodiment of a process 10c (FIG. 7) for forming the resonant frequency circuit comprises the steps of: (1) securing a first conductive foil to a first surface of a first substrate to form a first conductive layer (step 102); (2) applying an acid resist to the foil and curing the resist by heat or by ultra-violet radiation (step 104); (3) etching the first conductive layer to form a first conductive trace where the first conductive trace includes one or more inductors and one or more first capacitor plates (step 106); (4) securing a second conductive foil to a second substrate to form a second conductive layer (step 108); (5) forming a second conductive trace on the second substrate by cutting the second conductive layer, where the second conductive trace includes one or more second capacitor plates (step 110); (6) removing a waste portion of the second conductive layer (step 112); (7) laminating the second conductive trace to the first conductive trace with a dielectric layer therebetween, and with each second capacitor plate overlying and generally aligned with a respective first capacitor plate (step 114); crimping the laminate and forming the deactivation area in the laminate (step 116); and finishing the laminate to form a resonant frequency tag as previously described (step 118).

Figure 7:
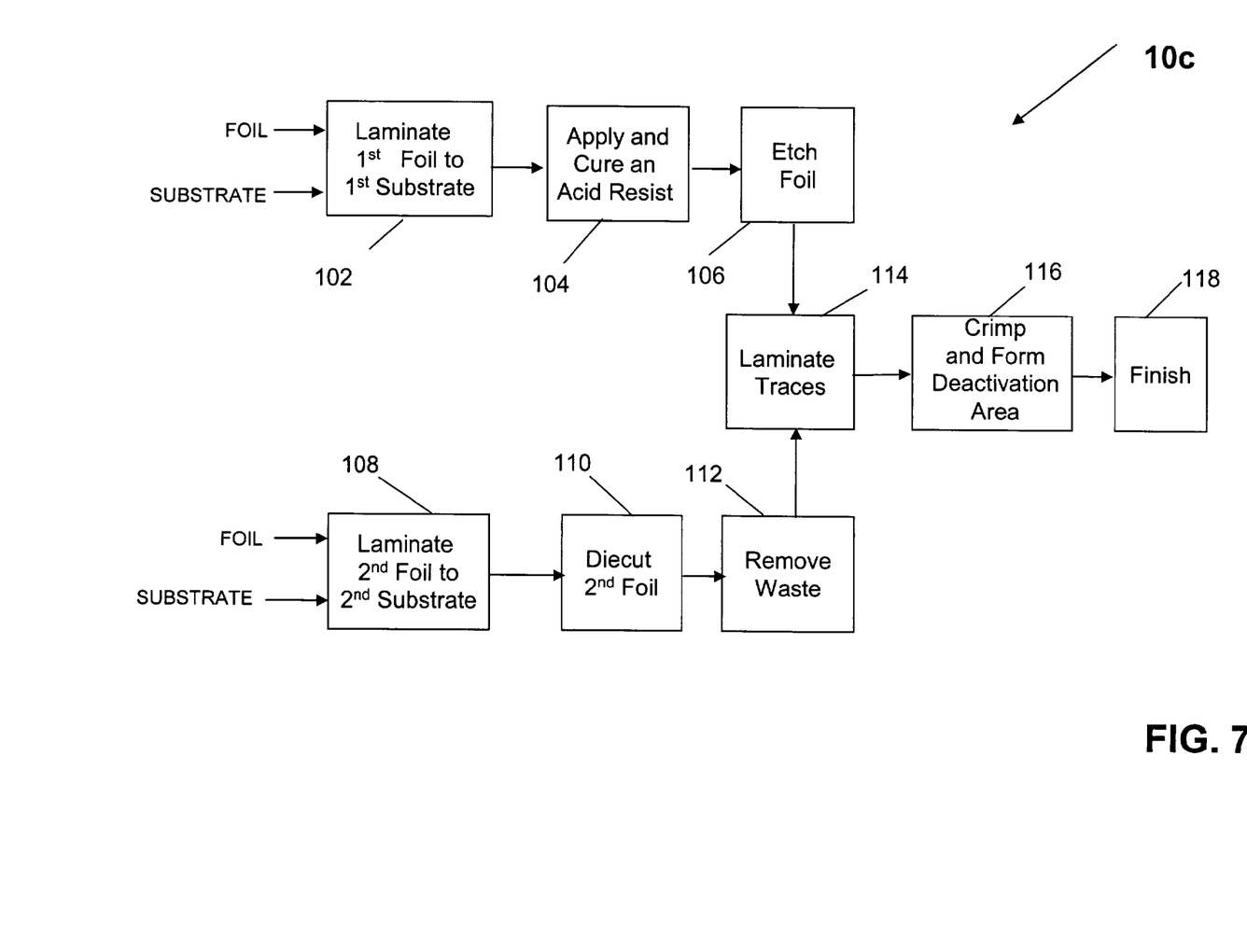
FIG. 7 is a schematic block diagram of a process for making the resonant tag according to a third preferred embodiment.

The third preferred embodiment differs from the first preferred embodiment and the second preferred embodiment by forming the first conductive trace by etching (rather than by cutting) the first conductive foil using a standard etching process well known to those skilled in the art. Etching the first conductive foil allows the first conductive trace to be formed with narrower line widths and closer spacing than can be achieved by diecutting. The ability to form the narrower line widths and closer spacing allows for the coils to be formed with more turns per unit area. Accordingly, the resonant frequency circuits may be made smaller in area than those made by diecutting the first conductive trace.

Forming the first conductive trace according to the third preferred embodiment provides a capability for maximizing the ratio of the radiated signal amplitude of the resonant circuit to the area of the resonant circuit.

Preferably, the first substrate is a dielectric material such as polyethylene or polyester and the dielectric layer between the first and the second conductive traces is formed from the first substrate. Alternatively, the first conductive trace may be flood coated with a dielectric material to form the dielectric layer. Then again, an ink having dielectric properties may be used as the acid resist in the etching process to form the first conductive trace, and the resist may then be used to form the dielectric layer. The dielectric layer used with the first conductive trace formed by etching has a thickness in the range of about 1–10 microns and preferably in the range of 2–4 microns. As would be clear to those skilled in the art, many known options are available for forming a resonant frequency circuit by etching a foil, and are not described here for the sake of brevity.

As will be apparent to one skilled in the art, the present invention provides a method for making resonant tags which does not require etching for forming the resonant circuit. Further, the present invention reduces wastage by utilizing both the first and the second portions of the diecut foil, thus using substantially all of the conductive foil for making the tags.

It will be appreciated by those skilled in the art that changes could be made to the embodiments described above without departing from the broad inventive concept thereof. For instance, although the method for making the security tags is described as using continuous webs for forming the tags, the method also applies to forming the tags from sheets by using sheet feeders and sheet handling equipment. It is understood, therefore, that this invention is not limited to the particular embodiments disclosed, but it is intended to cover modifications within the spirit and scope of the present invention as defined by the appended claims.

We claim:

1. A method of making a tag comprising the steps of: providing a first adhesive layer in a first predetermined pattern between a surface of a first substrate and a first conductive foil, the first adhesive pattern corresponding to a desired pattern for a first conductive trace; laminating a first conductive foil to the surface of the first substrate to form a first conductive layer; forming a first portion of the first conductive layer in a shape generally corresponding to the first predetermined pattern; and removing a second portion of the first conductive layer not corresponding to the first portion to thereby establish the first conductive trace on the surface of the first substrate, with the adhesive layer corresponding in shape and size to the first conductive trace and confined within the periphery of the first conductive trace.

2. The method as recited in claim 1, wherein the tag is a resonant tag and the first conductive trace comprises a first inductor and a first capacitor plate.

3. The method as recited in claim 2, wherein the second portion is removed by:
   forming a second adhesive layer on a second substrate in a pattern generally corresponding to the second portion;
   laminating the second substrate to the first substrate such that the second adhesive pattern engages the second portion of the first conductive layer; and
   separating the second substrate, including the second portion, from the first substrate to form a second conductive trace on the second substrate, wherein the first portion is formed by diecutting prior to laminating the second substrate to the first substrate.

4. The method as recited in claim 3, wherein said tags are made in a sequential operation wherein a plurality of first substrates with the first conductive layer are rolled up on a first rewind roll and a plurality of second substrates with the second conductive trace are rolled up on a second rewind roll.

5. The method as recited in claim 3, wherein the second conductive trace comprises at least one second inductor and at least one second capacitor plate.

6. The method as recited in claim 5, wherein an inductance of the first inductor is substantially equal to an inductance of the second inductor, and an area of the first capacitor plate is substantially equal to an area of the second capacitor plate.

7. The method as recited in claim 5, further comprising the steps of:
   forming a third conductive trace on a third substrate, the third conductive trace including at least a third capacitor plate; and
   securing the third conductive trace to the second conductive trace with a dielectric layer therebetween and with the third capacitor plate overlying with the second capacitor plate.

8. The method according to claim 7, wherein the third conductive trace has a repeat length that is smaller than a repeat length of the second conductive trace.

9. The method as recited in claim 7, wherein the third conductive trace is secured to the second conductive trace by heating the second substrate and the third substrate over an area larger than the third conductive trace.

10. The method as recited in claim 7, wherein the third conductive trace is formed by the steps of:
    forming the dielectric layer on a first surface of the second conductive foil;
    forming a third adhesive layer on a second surface of a second conductive foil;
    laminating the second conductive foil to the third substrate with the adhesive therebetween to form a second conductive layer;
    cutting the second conductive layer to form a first portion in the shape of the third conductive trace; and removing from the third substrate, a second portion of the second conductive layer not corresponding to the first portion.

11. The method as recited in claim 10, wherein the third adhesive layer is formed from a removable, pressure sensitive adhesive.

12. The method as recited in claim 11, wherein the third adhesive layer is flood coated.

13. The method as recited in claim 10, wherein the dielectric is a heat seal dielectric applied by printing.

14. The method as recited in claim 7, further comprising the steps of:
    establishing an electrical connection between the third conductive trace and one or the other of the first and the second conductive traces; and
    establishing a weakened area of the dielectric layer in the area between the third capacitor plate and one or the other of the first and second capacitor plates.

15. The method as recited in claim 2, further comprising the steps of:
    forming a third conductive trace on a third substrate, the third conductive trace including a third capacitor plate; and
    securing the third conductive trace to the first conductive trace with a dielectric layer therebetween and with the third capacitor plate overlying the first capacitor plate.

16. The method according to claim 15, wherein the third conductive trace has a repeat length that is smaller than a repeat length of the second conductive trace.

17. The method as recited in claim 15, wherein the third conductive trace is secured to the first conductive trace by heating at least the third substrate over an area larger than the third conductive trace.

18. The method according to claim 15, wherein the third conductive trace is formed by the steps of:
   forming the dielectric layer on a first surface of the second conductive foil;
   forming a third adhesive layer on a second surface of a second conductive foil;
   laminating the second conductive foil to the third substrate with the adhesive therebetween to form a second conductive layer;
   cutting the second conductive layer to form a first portion in the shape of the third conductive trace; and
   removing a second portion of the second conductive layer not corresponding to the first portion from the third substrate.

19. The method as recited in claim 18, wherein the third adhesive layer is formed from a pressure sensitive adhesive.

20. The method as recited in claim 19, wherein the third adhesive layer is flood coated.

21. The method as recited in claim 18, wherein the dielectric is a heat seal dielectric applied by printing.

22. The method as recited in claim 15, further comprising the steps of:
   establishing an electrical connection between the third conductive trace and the first conductive trace and
   establishing a weakened area of the dielectric layer in the area between the third capacitor plate and one or the other of the first and second capacitor plates.

23. The method as recited in claim 1, wherein the first conductive layer is formed into the shape generally corresponding to the pattern of the first adhesive layer by diecutting.

24. The method as recited in claim 1, wherein the first adhesive layer is applied by printing.

25. The method as recited in claim 24, wherein the first adhesive layer is applied by flexographic printing.

26. The method as recited in claim 1, wherein the first adhesive layer is comprised of an aggressive pressure sensitive adhesive.

27. The method as recited in claim 1, wherein the first adhesive layer is cured by ultraviolet radiation or by an electron beam.

28. The method as recited in claim 1, wherein said first conductive foil has a first surface and a second surface, the first surface confronting the surface of the first substrate, the second surface disposed opposite the first surface, and wherein a dielectric is applied to at least the second surface of the first conductive layer prior to laminating the first conductive foil to the first substrate.

29. The method as recited in claim 28, wherein the dielectric is a heat-seal dielectric applied by a method selected from the group of flood coating and printing.

30. The method as recited in claim 1, wherein the laminating is performed subsequent to applying the first adhesive layer in a first predetermined pattern to the surface of the first substrate.

31. A method of making tag comprising the steps of:
   securing a first conductive foil to a first surface of a first substrate to form a first conductive layer;
   etching the first conductive layer to form a first conductive trace, the first conductive trace including at least one inductor and at least one first capacitor plate;
   providing an adhesive in a predetermined pattern on a second substrate, the predetermined pattern corresponding in shape and size to a second conductive trace and confined within the periphery of the second conductive trace, the second conductive trace comprising at least one second capacitor plate;
   securing a second conductive foil to the second substrate by the patterned adhesive to form a second conductive layer;
   forming the second conductive trace on the second substrate by cutting the second conductive layer and removing a portion of the second conductive layer lying outside the bounds of the patterned adhesive; and
   laminating the second conductive trace to the first conductive trace with a dielectric layer therebetween, the at least one second capacitor plate overlying the at least one first capacitor plate.

32. The method according to claim 31 additionally comprising the steps: of forming a third conductive trace on a third substrate, the third conductive trace including at least a third capacitor plate; and securing the third conductive trace to the second conductive trace with a dielectric layer therebetween and with the third capacitor plate overlying and generally aligned with the second capacitor plate, wherein the third conductive trace has a repeat length that is smaller than a repeat length of the second conductive trace.

33. The method according to claim 31, wherein the first substrate is a dielectric and the dielectric layer is formed from the first substrate.

34. The method according to claim 31, further including the step of coating the first conductive trace with a dielectric to form the dielectric layer.

35. The method according to claim 31, wherein the step of etching the first conductive layer includes the step of applying an acid resisting ink having dielectric properties to the first conductive layer, and wherein the acid resistant ink forms the dielectric layer.

36. The method according to claim 31, wherein the dielectric layer is in the range of about 1–10 microns.

37. The method according to claim 31, wherein the dielectric layer is in the range of about 2–4 microns.

38. A tag comprising, a substrate having a substrate surface, a first electrically conductive layer having a first predetermined pattern corresponding to a desired final pattern for a first conductive trace, said first electrically conductive layer being adhesively secured to said substrate surface by a preformed first adhesive layer, said preformed first adhesive layer corresponding in shape and size to said first predetermined pattern and confined within the periphery of said first conductive trace, said first preformed adhesive layer being directly secured to said substrate so that said adhesive layer is confined to said first predetermined pattern.

39. The tag of claim 38 wherein said tag is a resonant tag comprising a second electrically conductive layer having a second predetermined pattern, said second electrically conductive layer being adhesively secured to a portion of said tag.

40. The resonant tag of claim 39, wherein at least one of said first and second electrically conductive layers comprises an inductive element and wherein one of said first and second electrically conductive layers comprises a first plate of a capacitive element.

41. The resonant tag of claim 40, wherein the other of said first and second electrically conductive layers comprises a second plate of said capacitive element.

42. The resonant tag of claim 39, further comprising a second adhesive layer disposed between said first electrically conductive layer and said second electrically conductive layer for adhesively securing said second electrically conductive layer to said first electrically conductive layer.

43. The resonant tag of claim 42, wherein said second adhesive layer comprises a second patterned adhesive layer.

44. The resonant tag of claim 43, wherein said second patterned adhesive layer is a flexographic printed layer.

45. The resonant tag of claim 43, wherein said preformed first adhesive layer is a flexographic printed layer and said second patterned adhesive layer is a flexographic printed layer.

46. The resonant tag of claim 43, wherein said second electrically conductive layer is formed from a second sheet of conductive material applied to said second patterned adhesive layer.

47. The resonant tag of claim 46, wherein said second sheet of conductive material is die cut in the shape of said second patterned adhesive layer.

48. The resonant tag of claim 42, wherein said first electrically conductive layer is formed from a first sheet of conductive material applied to said first patterned adhesive layer.

49. The resonant tag of claim 48, wherein said first sheet of conductive material is die cut in the shape of said preformed first adhesive layer.

50. The resonant tag of claim 39 wherein at least one of said first and second electrically conductive layers comprises a coating of dielectric material.

51. The resonant tag of claim 50, wherein said coating of dielectric material is disposed between said first and said second electrically conductive layers to form a capacitive element.

52. The resonant tag of claim 50, wherein each of said first and second electrically conductive layers comprises a coating of dielectric material.

53. The resonant tag of claim 52, wherein said coating of dielectric material comprises a flood coated dielectric layer.

54. The resonant tag of claim 52, wherein said coating of dielectric material is disposed between said first and said second electrically conductive layers to form a capacitive element.

55. The resonant tag of claim 39, wherein said first and second electrically conductive layers are of substantially the same shape.

56. The resonant tag of claim 39, wherein said first and second electrically conductive layers are substantially coincident with each other.

57. The resonant tag of claim 39 wherein said substrate comprises a non-polymeric material.

58. The resonant tag of claim 57 wherein said substrate comprises paper.

59. The tag of claim 38, wherein said preformed first adhesive layer is a flexographic printed layer.

60. The resonant tag of claim 39, wherein said first electrically conductive layer is formed from a first sheet of conductive material applied to said first patterned adhesive layer and said second electrically conductive layer is formed from a second sheet of conductive material applied to said second patterned adhesive layer.

61. The resonant tag of claim 60, wherein said first sheet of conductive material is die cut in the shape of said preformed first adhesive layer and said second sheet of conductive material is die cut in the shape of said second patterned adhesive layer.

62. The tag of claim 38, wherein said first electrically conductive layer comprises a coating of dielectric material.

63. The tag of claim 62, wherein said coating of dielectric material comprises a flood coated dielectric layer.

64. The tag of claim 38, wherein said substrate comprises a non-polymeric material.

65. The tag of claim 64, wherein said substrate comprises paper.

66. The tag of claim 38, wherein said tag is arranged to be deactivated by the application of energy thereto.

67. The tag of claim 66, further comprising a weakened area between said first and second electrically conductive layers, said weakened area having a reduced breakdown voltage for permitting deactivation of said resonant tag.

68. A resonant tag, comprising a substrate having a substrate surface, a first electrically conductive layer and a second electrically conductive layer, said first electrically conductive layer having a first predetermined pattern, and being adhesively secured to said substrate surface by a patterned first adhesive layer corresponding in shape and size to said first predetermined pattern and confined within the periphery of said first predetermined pattern, said first patterned adhesive being directly secured to said substrate surface, said second electrically conductive layer having a second predetermined pattern, said second electrically conductive layer being indirectly adhesively secured to said substrate by said first adhesive layer to form a resonant circuit.

69. The resonant tag of claim 68, wherein said second electrically conductive layer is secured to a dielectric layer and said dielectric layer is secured to said first electrically conductive layer by a heat seal.

70. The resonant tag of claim 68, wherein at least one of said first and second electrically conductive layers comprises an inductive element and wherein one of said first and second electrically conductive layers comprises a first plate of a capacitive element.

71. The resonant tag of claim 70, wherein the other of said first and second electrically conductive layers comprises a second plate of said capacitive element.

72. The resonant tag of claim 68, further comprising a second adhesive layer disposed between said first electrically conductive layer and said second electrically conductive layer for adhesively securing said second electrically conductive layer to said first electrically conductive layer.

73. The resonant tag of claim 72, wherein said second adhesive layer comprises a second patterned adhesive layer.

74. The resonant tag of claim 73, wherein said first patterned adhesive layer is a flexographic printed layer.

75. The resonant tag of claim 73, wherein said second patterned adhesive layer is a flexographic printed layer.

76. The resonant tag of claim 73, wherein said second electrically conductive layer is formed from a second sheet of conductive material applied to said second patterned adhesive layer.

77. The resonant tag of claim 76, wherein said second sheet of conductive material is die cut in the shape of said second patterned adhesive layer.

78. The resonant tag of claim 73, wherein said first electrically conductive layer is formed from a first sheet of conductive material applied to said first patterned adhesive layer and said second electrically conductive layer is formed from a second sheet of conductive material applied to said second patterned adhesive layer.

79. The resonant tag of claim 78, wherein said first sheet of conductive material is die cut in the shape of said first patterned adhesive layer and said second sheet of conductive material is die cut in the shape of said second patterned adhesive layer.

80. The resonant tag of claim 72, wherein said first electrically conductive layer is formed from a first sheet of conductive material applied to said first patterned adhesive layer.

81. The resonant tag of claim 80, wherein said first sheet of conductive material is die cut in the shape of said first patterned adhesive layer.

82. The resonant tag of claim 68, wherein said first patterned adhesive layer is a flexographic printed layer.

83. The resonant tag of claim 68, wherein at least one of said first and second electrically conductive layers comprises a coating of dielectric material.

84. The resonant tag of claim 83, wherein said coating of dielectric material comprises a flood coated dielectric layer.

85. The resonant tag of claim 83, wherein said coating of dielectric material is disposed between and secured to said first and second electrically conductive layers to form a capacitive element.

86. The resonant tag of claim 85, wherein said coating dielectric material is heat sealed to at least one of said first and second conductive layers.

87. The resonant tag of claim 83, wherein each of said first and second electrically conductive layers comprises a coating of dielectric material.

88. The resonant tag of claim 87, wherein each of said coatings of dielectric material comprises a flood coated dielectric layer.

89. The resonant tag of claim 68, wherein said substrate comprises a non-polymeric material.

90. The resonant tag of claim 89, wherein said substrate comprises paper.

91. The resonant tag of claim 68, wherein said first and second electrically conductive layers are of substantially the same shape.

92. The resonant tag of claim 68, wherein said first and second electrically conductive layers are substantially coincident with each other.

93. The resonant tag of claim 68, wherein said tag is arranged to be deactivated by the application of energy thereto.

94. The resonant tag of claim 93 further comprising a weakened area between said first and second electrically conductive layers, said weakened area having a reduced breakdown voltage for permitting deactivation of said resonant tag.

* * * * *